Dec. 7, 1965  J. W. JACOBS ET AL  3,221,524
DOMESTIC APPLIANCE USING A FILTER
Filed Oct. 27, 1961  2 Sheets-Sheet 1
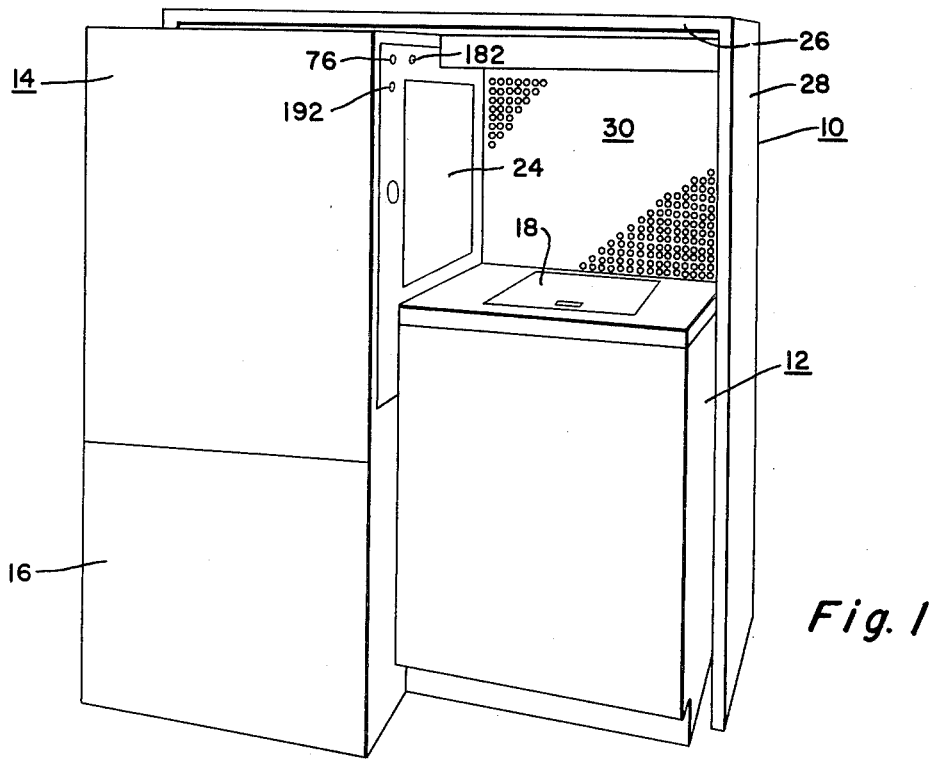
Fig. 1
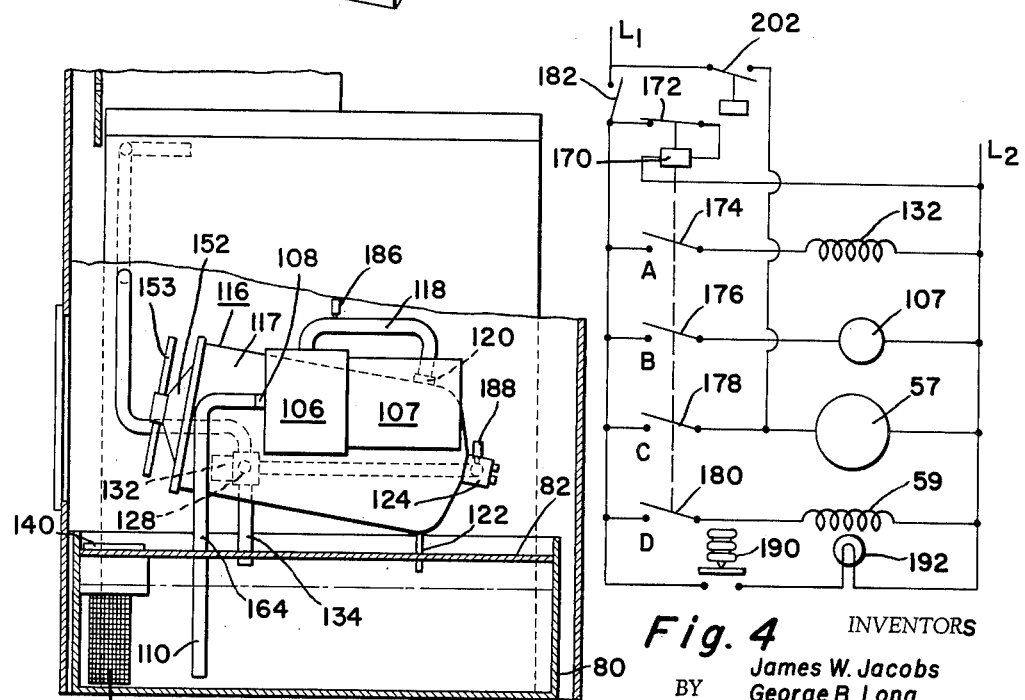
Fig. 3
Fig. 4
INVENTORS
James W. Jacobs
George B. Long
BY
Frederick M. Ritchie
Their Attorney Dec. 7, 1965   J. W. JACOBS ET AL   3,221,524
DOMESTIC APPLIANCE USING A FILTER
Filed Oct. 27, 1961   2 Sheets-Sheet 2

INVENTORS
James W. Jacobs
George B. Long
BY
Frederick M. Ritchie
Their Attorney

United States Patent Office 3,221,524
Patented Dec. 7, 1965

3,221,524
DOMESTIC APPLIANCE USING A FILTER
James W. Jacobs and George B. Long, both of Dayton, Ohio, assignors to General Motors Corporation, Detroit, Mich., a corporation of Delaware
Filed Oct. 27, 1961, Ser. No. 148,235
1 Claim. (Cl. 68—12)

This invention relates to a domestic appliance and more particularly to an improved apparatus for increasing the life of a filter cartridge in a dry cleaning system.

Convenience in usage has been a predominant factor in the development of the compact dry cleaning systems now finding popularity in the coin-operated laundries. The replaceable filter system taught in copending application Serial No. 105,733, filed April 26, 1961, abandoned and refiled as continuation application Serial No. 285,189, now Patent 3,132,501 issued May 12, 1964, and assigned to the same assignee, emphasizes convenience and lends itself to service maintenance by the mechanically unskilled attendants in such coin-operated laundries. Thus, in such a system an easily replaceable cartridge is positioned in the solvent circulating system to filter contaminants from the circulating solvent; and the number of cycles through which the filter cartridge is effective determines in large measure the efficiency and profitable nature of the service.

Accordingly, it is an object of this invention to increase the life of an expandable dry cleaning filter cartridge before it is disposed of.

Another object of this invention is the provision of means for periodically exposing the filter cartridge to air pressure within the recirculating solvent system to shock, bump or urge the surface sludge into the body of the cartridge, thereby to extend the life of the cartridge.

A further object of this invention is the provision of an emergency pump system automatically operable to return solvent to its storage container in case of a malfunction in the solvent circulating system.

Further objects and advantages of the present invention will be apparent from the following description, reference being had to the accompanying drawings wherein a preferred embodiment of the present invention is clearly shown.

In the drawings:

FIGURE 1 is a perspective front view of dry cleaning apparatus suitable for use with this invention;

FIGURE 3 is a fragmentary sectional view, partly in elevation, taken along line 3—3 in FIGURE 2;

FIGURE 4 is a schematic wiring diagram for the control of this invention; and

Figures 2, 5:
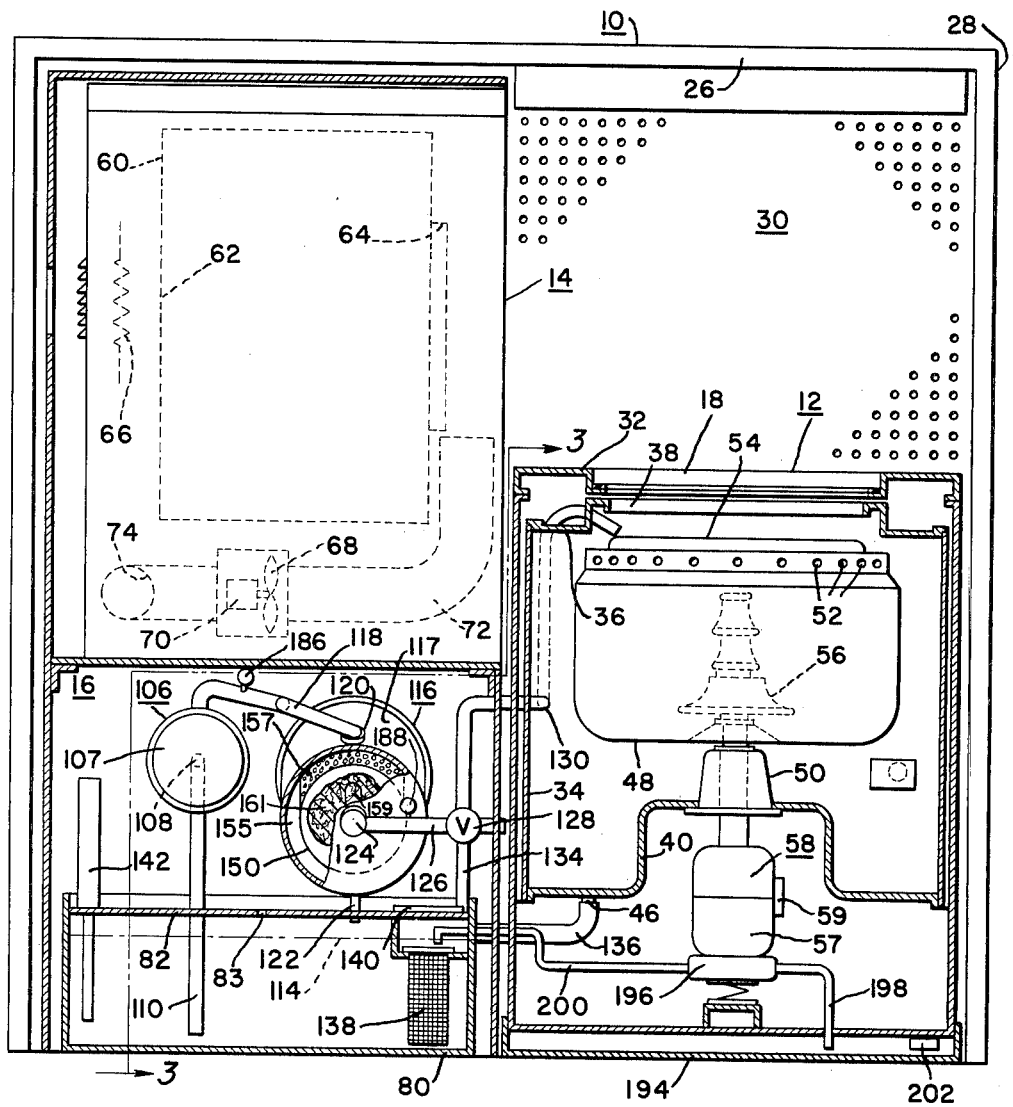
FIGURE 2 is a sectional view, partly in elevation, to show the working components of the dry cleaning apparatus shown in FIGURE 1.
FIGURE 5 is a cycle chart for indicating operation of the wiring diagram of FIGURE 4.

In accordance with this invention and with reference to FIGURE 1, a dry cleaning system is pictorially illustrated. The system includes an outer cabinet 10 for partially enclosing a clothes washer, cleaner or agitating apparatus 12 and a clothes dryer or drying apparatus 14. Note that the clothes dryer 14 is elevated above the floor to provide for a filter compartment 16 therebelow. The clothes washer 12 has a top access door 18 which is pivotally openable for inserting and removing fabrics from the washer.

The clothes dryer 14 has a front access opening 24 which faces the washer access opening 18 adjacent one side thereof. This arrangement places the access doors 18 and 24 in a confined area defined by top wall 26 and a side wall 28 of the dry cleaning cabinet 10—a perforate grill 30 at the rear of the confined space operating to withdraw fumes from the area whenever either access door 18 or 24 is opened. The outlet or vent grill 30 is connected to the atmosphere through a venting system at the rear of the cabinet as set forth more fully in the commonly assigned copending application Serial No. 105,733 to which reference may be had for greater detail regarding the dry cleaning apparatus.

Turning now to FIGURE 2, the cleaner or agitating apparatus 12 is shown comprised of an outer cabinet or casing 32 in the top wall of which is located the access door 18 hinged along a rear edge thereof. Within the washer cabinet 32 a generally cylindrical imperforate solvent container 34 is disposed which includes a sub-top portion 36 having an access opening 38 in axial alignment with the top access lid 18 of the washer. A bulkhead 40 closes the lower end of the solvent container 34 and includes a drain opening 46 in a lowermost portion thereof. A generally cylindrical spin tub 48 is rotatably supported by a resilient inverted cuplike member 50 on the bulkhead 40 and includes a plurality of circumferentially arranged outflow ports 52 around an upper portion thereof. The tub 48 has a top access opening 54 which aligns with the openings 18 and 38 immediately above. Within the spin tub 48 an agitator 56 is adapted for vertical reciprocation. An agitating and spinning mechanism 58 driven by a motor 57 is adapted to vertically reciprocate the agitator 56 when operated with a solenoid 59 de-energized and to rotate or spin the tub 48 when operated with the solenoid 59 energized. By way of suggesting one suitable agitating and spinning mechanism 58 but not by way of limiting this invention, reference may be had to the patent to Clark 2,422,395, issued June 17, 1947.

The clothes dryer 14 is a conventional single pass air dryer substantially like that taught in the patent to Whyte 2,843,945, issued July 22, 1958. The dryer includes a horizontally rotatable tumbling drum 60 having a perforate rear wall 62 and a front access opening 64 in alignment with the dryer door 24. A drying heater 66 is disposed adjacent the perforate rear wall 62 of the tumbling drum and adapted to be energized for drying clothes within the tumbling drum. During operation of the heater 66 and rotation of the tumbling drum 60, air is circulated by a fan, shown generally at 68, driven by a motor 70 which may also be connected through a conventional pulley system for rotating the tumbling drum 60. The fan 68 is connected with the access opening 64 by way of a front duct 72, said front duct being exhausted by the fan through an exhaust duct 74, connected behind the dry cleaning cabinet to the outside vent system or to a conventional solvent adsorber or reclaimer. The dryer includes a push button 76 (FIGURE 1) for initiating a predetermined drying cycle at the conclusion of wash after the clothing have been removed from the washing apparatus and placed in the tumbling drum 60.

The circulating system for a dry cleaning fluid or solvent, such as perchlorethylene (a somewhat toxic dry cleaning fluid) or Valclene (a nontoxic dry cleaning fluid made by the Du Pont Corporation and which is essentially Freon 113 with a detergent additive), will now be described with reference to FIGURES 2 and 3. The main components of the circulating system include a sump 80 having a top wall 82 with an air vent and spill-over return 83. Above the sump top wall 82 is a pump 106 driven by a pump motor 107. The pump has its inlet 108 connected through a solvent suction dip tube 110 to the bottom of the sump 80. A filter assembly 116 is adapted to receive the output of the pump through a sloped conduit 18 which connects to the inlet 120 of the filter. The filter casing 117 is positioned angularly in the filter compartment 16, such that a restricted gravity drain or bleed-drain means 122 extends through the sump wall 82 to substantially drain the filter casing of solvent when the dry cleaning system is shut down. During operation of the pump 106, a small metered flow is continuously shunted to the sump, the flow being sufficiently small that the main flow to the tub 48 is not adversely affected. At one end of the filter casing an outlet fitting 124 connects by way of conduits 126 and 130 through a two-way valve 128 to the tub access opening 54—a terminal portion of the conduit 130 overlying the top of the spin tub 48. The valve 128 is controlled by a solenoid 132 into a first position connecting the filter outlet 124 to the spin tub 48 (solenoid energized) and a second position connecting the filter outlet to a sump return line 134 (solenoid de-energized). Completing the circulating system is a conduit 136 which connects to the drain outlet 46 of the solvent container 34. This conduit 136 enters the sump 80 by way of a button trap 138, access to which is gained through a removable lid 140 for cleaning the trap device as well as for adding additional solvent to the system. A sight glass 142, or other suitable means, may be used for providing a visual indication of the dry cleaning fluid level in the sump.

The fluid circulation system operates as follows. The pump 106 draws dry cleaning fluid or solvent from sump 80 through the dip tube 110. The dry cleaning fluid, cleaned of large objects by the trap 138, is forced through the conduit 118 to the filter 116. The filter, which will be described more fully hereinafter, is effective to filter small solids, solubles and carbon from the dry cleaning fluid. After an initial period during which the valve 128 returns the solvent to the sump and the solvent is recirculated to remove free filter carbon, the valve is actuated by energizing solenoid 132 and the filtered dry cleaning fluid is then discharged from the filter by way of the conduits 126 and 130 into the spin tub. When the level of dry cleaning fluid within the tub reaches the outflow ports 52, the dry cleaning fluid will overflow into the solvent container 34 and return by gravity through the conduit 136 to the sump 80—the button trap 138 intercepting its flow to remove large objects from the fluid.

For the purposes of this invention and with reference to FIGURE 2, the arrangement of the filter 116 includes the filter casing 117 adapted to contain a removable throwaway filter element, shown generally as 150. This throwaway element 150 is retained in the filter casing by a removable door or cover 152 (FIGURE 3) which is locked to the casing by a handle 153 which is engaged with the casing in any suitable manner. Suitable seals are provided within the filter casing 117 to interpose the filter cartridge 150 between the inlet fitting 120 of the casing and the outlet fitting 124. Thus, all solvent passing through the filter casing 117 must enter the casing in the annular space 155 surrounding the peripheral or perforated outer surface 157 of the filter cartridge. From there the solvent under pressure will be equally distributed about the cartridge and will move radially inwardly to a center outlet channel 159 of the cartridge which is joined with the outlet fitting 124 leading from the filter.

This invention pertains to extending the life of a depth-type filter cartridge 150 by insuring that the entire radial depth or cross section of the cartridge is utilized during its life in the circulating solvent system. It should be appreciated that solvent in moving through the filter casing 117 from its inlet 120 to its outlet 124 will deposit particulate matter on the exterior or peripheral surface 157 of the cartridge. As this sludge builds up on the surface of the cartridge, the pores of the cartridge are clogged and the effectiveness of the inner depth filtering material 161 of the cartridge is negated. Thus, this invention is directed to a control means whereby the surface sludge or coating can be forced inwardly at periodic intervals during the life of the cartridge, thereby to more effectively use the entire bulk of the cartridge.

The technique of this invention shall be called bumping—a term which is intended to mean the forcing of surface sludge inwardly from the outer surface of the cartridge towards the interior thereof. This aspect of the invention will be described with reference to FIGURES 2, 4 and 5. In general, the sludge is bumped inwardly from the surface 157 of the cartridge by periodically exposing the annular space 155 to air under pressure instead of solvent under pressure. The life of the filter cartridge 150 will depend in large measure upon the amount of soil in the clothes being cleaned, and, thus, the amount of soil which must be removed from the recirculating solvent. However, it is known that particulate matter collects first on the surface 157 of the filter cartridge and the effectiveness of the cartridge depends primarily upon the extent to which the cartridge can remain effective to filter throughout its entire depth or bulk. Thus, this invention employs bumping at the beginning of each cleaning cycle.

With reference to FIGURE 4, this bumping technique will now be described more fully. A timing means 170 having a control switch 172 is incorporated to control a plurality of timer switches 174, 176, 178 and 180. These timer switches are in control, respectively, of the solenoid 132 for the valve 128, the pump motor 107 for recirculating solvent, the main motor 57 for operating the agitating and spinning mechanism and the spin solenoid 59 which is energizable to condition the agitating and spinning mechanism for spinning the tub 48. A main line switch 182 is manually closable to initiate the clothes cleaning cycle which is illustrated by the cycle chart in FIGURE 5. Note that the timer contacts A, B, C and D are closed, respectively, by the timer switches 174, 176, 178 and 180. Starting now with the OFF portion of the cycle chart, it is seen that the valve 128 is de-energized as are all the other circuit components. During this OFF cycle the solvent in the interior of the filter casing 117, namely the annular space 155 and the loosely held solvent in the cartridge, is drained through the restricted opening 122. The filter casing is relieved of any vapor locks during draining by having the casing open to the atmosphere through the sump return pipe 134. Thus, the start of each dry cleaning cycle will find the casing 117 completely drained and the chamber portion 155 surrounding the cartridge filled solely with air or vapor. When the switch 182 is closed to initiate the timed cleaning cycle, the timer motor 170 is energized and the contact B closed by the timer switch 176 to energize the circulating pump motor 107. The first suction of the pump 106 will draw solvent through the dip tube 110 into the conduit 118. This forces a slug of air (the piping and filter casing having drained during the OFF cycle) from the inlet side of the filter cartridge 150 toward the outlet 124. The valve solenoid 132 is deenergized since the timer switch 174 is open. At first the air is compressed in the space 155 as the pump continues to force liquid through the conduit 118. This air is forced through the surface 157 of the cartridge towards the outlet 124 from the filter casing. As it forces inwardly, it forces the sludge from the surface into the interior of the cartridge where remaining depth filtering portions of the cartridge are effective to retain the sludge contaminants. In this way the cartridge is blocked or clogged from the inside out. Next, the timer switches 174 and 178 close to energize the valve 128 for directing solvent to the spin tub 48 and simultaneously to energize the agitating and spinning mechanism motor 57 for agitating within the spin tub. This circuit condition is maintained during a wash period. At the conclusion of wash, the valve solenoid 132 is de-energized by the opening of timer switch 174 to return the filtered pump output to the sump, i.e. the pump remains energized. Simultaneously the timer switch 180 is closed to condition the agitate and spin mechanism 58 for spinning by energizing the solenoid 59. The solvent is, thus, centrifuged from the tub 48 and returns by gravity to the sump where it is recirculated between the sump and filter for a predetermined period sufficient to filter or decontaminate the soiled fluid. At the conclusion of an extended spin period wherein the solvent is forced from the fabric being cleaned, the timer switches 178, 180 and 172 open to terminate the dry cleaning cycle. During the OFF period between the termination of one cycle and the start of the next, the filter casing 117 will again drain and surround the cartridge with air or vapor. This air will be subsequently bumped inwardly when the pump motor 107 is re-energized to force the surface sludge inwardly from the outer surface of the cartridge. With this technique of bumping, the life of the filter cartridge may be extended appreciably.

It is also within the purview of this invention to include pressure gages 186 and 188 on opposite sides of the filter cartridge to indicate the pressure drop across the cartridge during solvent circulation. These pressure gages could be connected through a switch 190 which closes after a given pressure differential occurs to light an indicator bulb 192 as an indication that the cartridge is thoroughly clogged and ineffective at filtering solvent. At this signal the cartridge should be removed and disposed of.

Another aspect of this invention is directed to a safety feature to provide for a malfunction of the solvent circulating system which causes the solvent to overflow the cleaning apparatus 12. For this purpose a sump 194 is adapted to circumscribe and cradle the agitating apparatus 12 therein. A pump 196, driven by the motor 57 on the agitate and spin mechanism, has its inlet tube 198 connected to the sump 194 and its outlet 200 connected to return solvent to the sump 80. A float switch 202 in the sump 194 is connected to by-pass the timer 170 and energize the motor 57 for returning overflow solvent to the sump (FIGURE 4).

It should now be seen that an improved disposable filter system for a dry cleaning solvent has been taught wherein the life of the filter cartridge is extended by periodically bumping or forcing the surface sludge from the surface of the cartridge in order to more completely use the depth filtering ability of the cartridge.

While the embodiment of the present invention as herein disclosed constitutes a preferred form, it is to be understood that other forms might be adopted.

What is claimed is as follows:

In combination, dry cleaning apparatus having a solvent circulating system including a sump having an air vent means in the top thereof, wall means defining a filter chamber having an inlet and an outlet, a pump having an open ended inlet conduit in continuous open communication with said sump and an outlet conduit connected to said filter chamber inlet, a tub, a supply conduit having one end connected to the outlet of said filter chamber and another end in spaced air gap relationship to said tub, two-way valve means in said supply conduit between said ends and having an open ended sump return line in communication with said sump and the atmosphere, said valve means being actuatable selectively to connect said ends of said supply conduit to each other for directing solvent to said tub or to connect said one end of said supply conduit to said sump return line for directing solvent to said sump, said valve means when directing solvent to said sump placing the outlet of said filter chamber in communication with the atmosphere through said valve means, a removable, throw-away filter cartridge substantially filling said filter chamber and having an outer surface spaced from the wall means of said filter chamber to form an annular space in solvent flow receiving relationship to said filter chamber inlet, a central outlet channel spaced from said outer surface and in solvent flow supply relationship to said filter chamber outlet and filtering material filling the space between said outer surface and said central outlet channel in permanently fixed relationship thereto for filtering solvent flowing through the filter cartridge from said outer surface to said central outlet channel, first switch means operable in one manner for energizing said pump to pump solvent from said sump through said cartridge to said tub or said sump and operable in another manner to deenergize said pump, second switch means operable in one manner for actuating said valve means to direct solvent to said tub and operable in another manner for actuating said valve means to direct solvent to said sump and or to connect said filter chamber to atmosphere, bleed-drain means constructed and arranged to fluidly communicate the lowest point of the interior of said filter chamber with said sump, means including the open ended inlet conduit of said pump and the open ended sump return line and said bleed-drain means for completely draining said filter chamber, said inlet and outlet conduits of said pump and said one end of said supply conduit when said valve means is connecting said filter chamber to atmosphere through said open ended sump return line and said pump is deenergized thereby to admit air at atmospheric pressure to both the outer surface and the central outlet channel of said cartridge between periods of pump energization, and timing means for operating said first and second switch means throughout a plurality of successive dry cleaning cycles of predetermined duration, said timing means operating said first and second switch means in said another manner before the end of one of said dry cleaning cycles to facilitate the draining of said filter chamber, said inlet and outlet conduits of said pump and said one end of said supply conduit thereby to expose said outer surface of said cartridge to atmosphere and thereby condition said outer surface to receive sudden surges of high pressure air and solvent when said pump is reenergized in the next succeeding one of said dry cleaning cycles, said timing means at the start of said next succeeding one of said dry cleaning cycles operating said first switch means in said one manner to reenergize said pump and operating said second switch means in said another manner to continue the connection of said filter chamber to atmosphere through said open ended sump return line thereby to force filtered contaminants into said filtering material from said outer surface of said cartridge toward said central outlet channel progressively with each one of said dry cleaning cycles to insure that the entire radial cross section of the filtering material in said cartridge is utilized for filtering before the cartridge is thrown away.

References Cited by the Examiner

UNITED STATES PATENTS

| | | | |
|---|---|---|---|
| 824,973 | 7/1906 | Braznell | 210—167 |
| 870,631 | 11/1907 | Kneuper | 210—193 |
| 1,249,724 | 12/1917 | Davis | 210—409 |
| 1,348,159 | 8/1920 | Down | 210—218 X |
| 1,844,611 | 2/1932 | Spackman | 210—168 |
| 1,987,847 | 1/1935 | Flood | 210—167 |
| 1,992,101 | 2/1935 | Staurt | 210—193 X |
| 2,142,726 | 1/1939 | Hetzer | 210—167 X |
| 2,249,681 | 7/1941 | Briggs et al. | 210—168 |
| 2,670,082 | 2/1954 | Dunn et al. | 210—90 |
| 2,678,134 | 5/1954 | Middleton | 210—90 |
| 2,729,339 | 1/1956 | McCoy | 210—90 |
| 2,809,248 | 10/1957 | Frakes. | |
| 2,828,862 | 4/1958 | Johnson | 210—167 X |
| 2,979,375 | 4/1961 | Kircher et al. | 210—167 X |
| 3,066,803 | 12/1962 | Seils | 210—168 |
| 3,110,170 | 11/1963 | Long | 68—18 |
| 3,122,908 | 3/1964 | Stanulis et al. | 68—18 X |
| 3,132,501 | 5/1964 | Jacobs et al. | |

OTHER REFERENCES

Kovacs et al.: Design Factors in Selecting and Applying Filters, Machine Design, vol. 27, January 1955, pp. 167–178 (copy in Technical Library call No TJ1M16).

REUBEN FRIEDMAN, *Primary Examiner.*

CHARLES SUKALO, *Examiner.*